United States Patent [19]

Regina

[11] 4,363,155
[45] Dec. 14, 1982

[54] ICE BREAKER

[76] Inventor: Matthew J. Regina, 147-32 72nd Rd., Flushing, N.Y. 11367

[21] Appl. No.: 202,929

[22] Filed: Nov. 3, 1980

[51] Int. Cl.³ .......................... B60S 1/04; A47L 17/06
[52] U.S. Cl. .............................................. 15/236 R
[58] Field of Search ............. 15/105, 111, 236 R, 15/236 A, 236 B; 30/169, 171, 346.58, 164.9; 280/819, 824

[56] References Cited

U.S. PATENT DOCUMENTS

| 2,517,247 | 8/1950 | Seley | 15/105 |
| 2,582,913 | 1/1952 | Pfefferle | 30/346.58 |
| 4,114,267 | 9/1978 | Marchio et al. | 15/105 X |

FOREIGN PATENT DOCUMENTS

| 689059 | 3/1953 | United Kingdom | 15/111 |
| 1363488 | 8/1974 | United Kingdom | 30/169 |
| 2011820 | 7/1979 | United Kingdom | 30/169 |

Primary Examiner—Edward L. Roberts
Attorney, Agent, or Firm—Richard L. Miller

[57] ABSTRACT

A windshield ice scraper, including an all plastic main body which tapers at one end toward a point fitted with a stainless steel tip, an inverted, U-shaped cross handle on top of the main body, and opposite side edges being flared to a thinned flange.

1 Claim, 7 Drawing Figures

U.S. Patent  Dec. 14, 1982  4,363,155
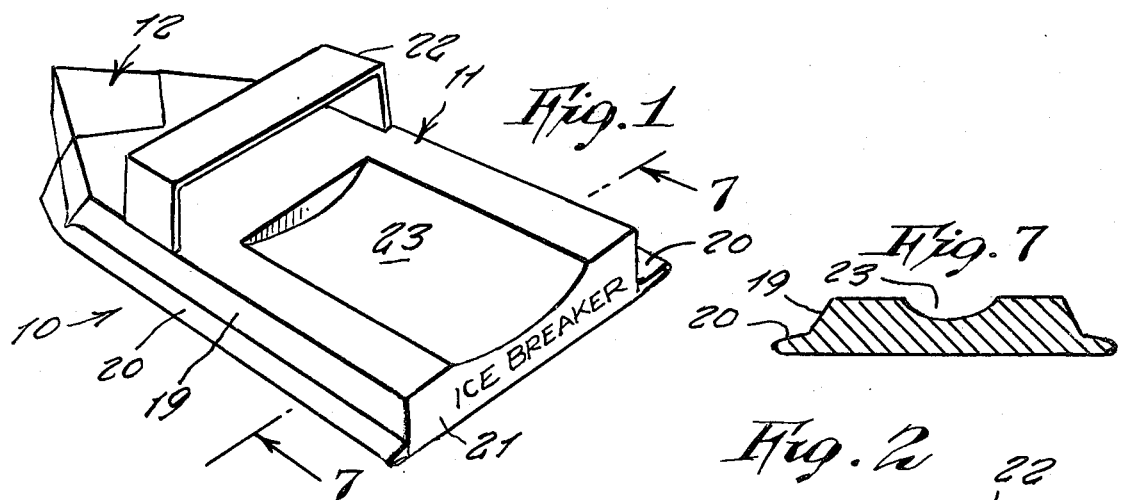
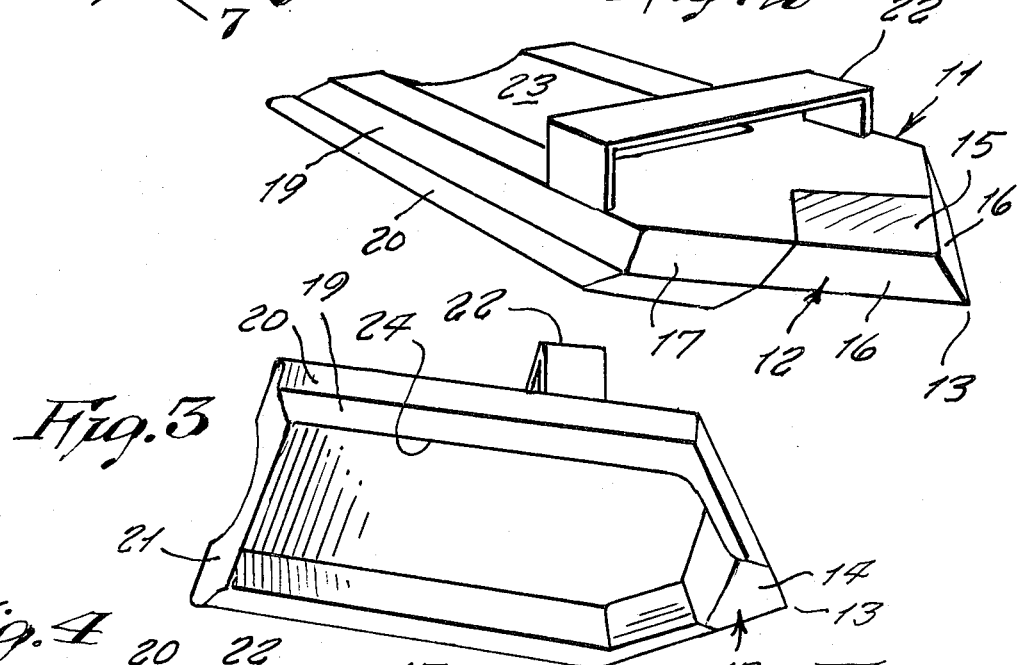
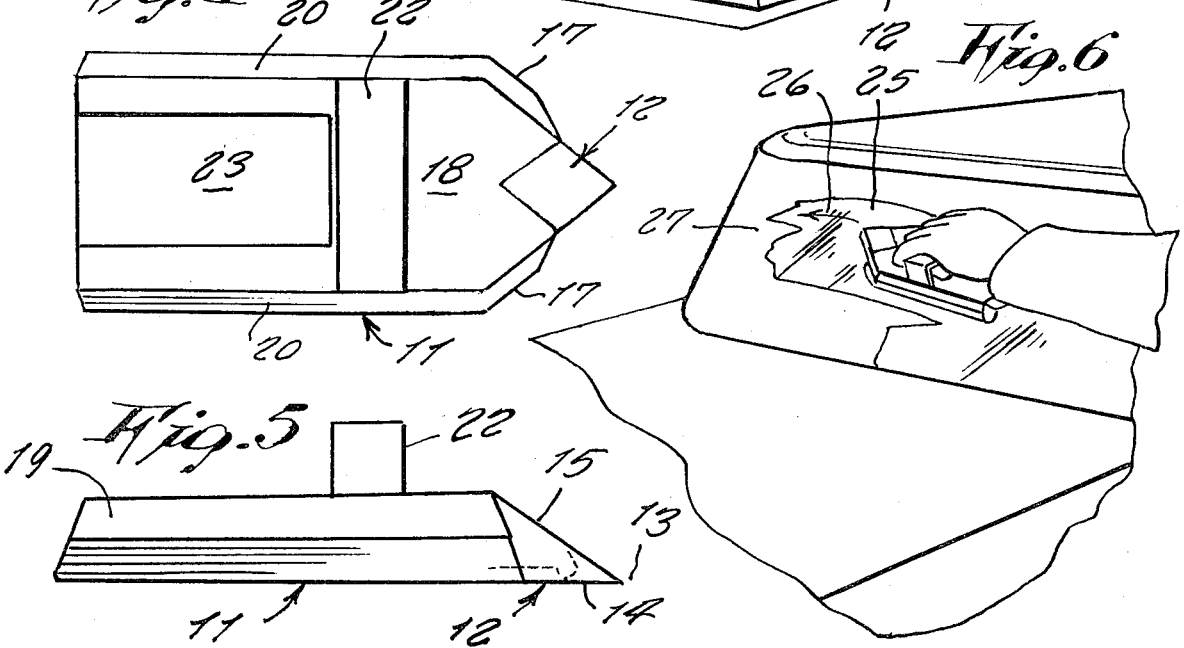

ICE BREAKER

BACKGROUND OF THE INVENTION

It is well known that numerous windshield ice scrapers have been designed in the past, however all of them are comparatively similar to each other in construction and use by including a transverse blade that is pushed forwardly and pulled rearwardly across the windshield surface so as to remove snow and sleet from the windshield. However such shaped blades must necessarily additionally include a row of teeth set back from the blade edge in order to break ice that has frozen on the glass, before it can be brushed away by the blade. It is believed that this design is in need of improvement so that the scraper is more efficient.

SUMMARY OF THE INVENTION

Accordingly, it is a principal object of the present invention, to provide an ice breaker of totally different design from the blade type ice scrapers, and which includes a pointed tip that is made of stainless steel, so as to be more effective than conventional rows of teeth made of molded plastic, in cutting through the ice.

Another object is to provide an ice breaker which flares rearwardly from the tip located at the front end, the flaring side edges of the device being thinned to a flange for scraping away the broken ice.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The Figures on the drawings are briefly described as follows:

FIG. 1 is a rear perspective view of the invention.

FIG. 2 is a front perspective view thereof.

FIG. 3 is a bottom perspective view.

FIG. 4 is a top view.

FIG. 5 is a side view.

FIG. 6 illustrates the invention in use scraping ice from a windowshield.

FIG. 7 is a cross sectional view taken on line 7—7 of FIG. 1.

DETAILED DESCRIPTION OF THE PREFERRED EMBODIMENT

Referring now to the drawing in greater detail, the reference numeral 10 represents an ice breaker according to the present invention, wherein there is a main body 11 made of molded, hard plastic, and a tip 12 made of stainless steel; the tip being installed within a tapered point formed at one end of the main body. The tip is sharpened to a forward apex 13 aligned with a lower flat face 14 of the tip, and from which a sloping upper surface 15 and converging side surfaces 16 extend.

The forward end of the main body tapers toward the tip 12 by including forwardly converging sides 17 that align with sides 16, and a top surface 18 that aligns with the top rear edges of surface 15.

The opposite sides 19 of the main body include sidewardly flaring flanges 20 that have edges running rearwardly parallel to each other. A rear wall 21 of the main body extends flat transversely across. The name "Ice Breaker" is printed thereacross.

An inverted, U-shaped handle 22 extends transversely across a top of the device.

A curved depression 23 on the top wall extends from rearwardly of the handle to the rear wall.

The underside is hollowed out with a recess 24, as shown in FIG. 3.

In operative use, it is now evident that holding the device by its handle, as shown in FIG. 6, and moving it across a windshield 25 as shown by arrow 26, the ice 27 is broken away therefrom and then brushed off thereby.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

I claim:

1. An ice beaker comprising in combination, a main body member molded of rigid plastic material, and a tip member made of stainless steel, said tip member being affixed to a front end of said main body member; said main body member front end being tapered forwardly by means of forwardly converging flanged sides, said tip member being installed within a tapered point of said main body member, said tip member being sharpened to a forward apex; a rear wall of said main body member extending flat transversely across, an inverted, U-shaped handle across a top of said main body member, a curved depression on a top wall of said main body member extending rearwardly of said handle to said rear wall, and a recess hollowed out on an underside of said main body member.

* * * * *